(12) United States Patent
Yamaga et al.

(10) Patent No.: US 7,320,841 B2
(45) Date of Patent: Jan. 22, 2008

(54) FUEL CELL AND SEPARATOR STRUCTURE USED THEREIN

(75) Inventors: Kenji Yamaga, Hitachi (JP); Hiroshi Yamauchi, Hitachi (JP); Ko Takahashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 557 days.

(21) Appl. No.: 10/785,988

(22) Filed: Feb. 26, 2004

(65) Prior Publication Data

US 2005/0089747 A1 Apr. 28, 2005

(30) Foreign Application Priority Data

Oct. 27, 2003 (JP) .............................. 2003-365958

(51) Int. Cl.
  *H01M 8/02* (2006.01)
  *H01M 8/10* (2006.01)
  *H01M 4/94* (2006.01)
(52) U.S. Cl. .......................................... 429/35; 429/38
(58) Field of Classification Search ................. 429/35, 429/38
  See application file for complete search history.

(56) References Cited

U.S. PATENT DOCUMENTS 6,231,053 B1 * 5/2001 Wakamatsu ................. 277/628

2004/0110056 A1 * 6/2004 Hatoh et al. .................. 429/38

FOREIGN PATENT DOCUMENTS

| JP | 2000-331691 | | 11/2000 |
| JP | 2001266910 A | * | 9/2001 |
| JP | 2003-272659 | | 9/2003 |

* cited by examiner

*Primary Examiner*—Gregg Cantelmo
(74) *Attorney, Agent, or Firm*—Antonelli, Terry, Stout & Kraus, LLP.

(57) ABSTRACT

Disclosed is a fuel cell having two or more stacked units each containing a first separator in which a manifold and fuel gas passage section are formed, first seal sheet which seals the first separator periphery, membrane electrode assembly, second seal sheet which seals a second separator periphery and second separator in which a manifold and oxidizing gas passage section are formed, in this order, wherein each of the fuel gas passage section and oxidizing gas passage section is in communication with the corresponding manifold. Comb teeth structure having comb teeth are provided between the fuel gas passage section and manifold and between the oxidizing gas passage section and manifold in a diffusion layer on the membrane electrode assembly, wherein slits spaces formed between the comb teeth are in communication with the diffusion layer.

22 Claims, 7 Drawing Sheets

FUEL CELL AND SEPARATOR STRUCTURE USED THEREIN

FIELD OF THE INVENTION

The present invention relates to a fuel cell and separator structure used therein.

BACKGROUND OF THE INVENTION

A fuel cell is an electrochemical device for directly transforming energy of a fuel into electric energy by electrochemical reactions. It has been growingly expected as a dispersion energy source of the next generation for its high efficiency and friendliness to environments.

A fuel cell is basically composed of two separators, an electrolyte, two electrodes and two diffusion layers. The separator is generally made of a carbon-based material, because it is required to have high electron conductivity and corrosion resistance, and is provided thereon with gas flow passages formed by cutting or pressing.

When a fuel cell is of stacked structure, a through-hole referred to as manifold is provided around the separator to supply a gas to or discharge gas from each cell.

The fuel cell of the above structure tends to suffer pressure drop caused by a sudden change in passage cross-section at the connection of the manifold. Increased pressure drop in a fuel cell requires increased capacity of the blower which supplies air to the cell to increase losses at the auxiliary devices, or increased discharge pressure of the hydrogen generating unit which supplies a fuel gas to the cell, making the overall system more complex.

JP-A-2000-331691 proposes an attempt to reduce pressure drop in a cell by adopting a series of three-dimensionally curved shapes for the connection between the manifold and gas passage leading to the electrode.

However, the proposal of JP-A-2000-331691 involves a problem of increased thickness of the cell, because it three-dimensionally machines the connection between the manifold and gas passage. A fuel cell should have a stacked structure of several tens to hundreds cells to have a desired voltage, because voltage which a single cell can develop is 1V or less. Increased separator thickness increases volume and weight of the stacked cell. Therefore, the techniques for decreasing separator thickness are essential for decreased system size and cost.

SUMMARY OF THE INVENTION

Decreasing overall thickness of a carbon separator is limited, because it comprises a flat plate engraved to form gas passages and is of relatively fragile material. By contrast, a separator of thin metallic plate of high ductility should have an overall thickness smaller than that of a carbon separator, when press-machined to have corrugated gas passages. Such a separator can satisfy the relationship $t \leq 1.0$ mm (where, t is thickness of its periphery on which a sealant or the like is placed) and in this case the relationship $T>t$ (where T is thickness of the gas passage section) holds. The inventors of the present invention have experimentally confirmed that a fuel cell including a separator which satisfies the relationships $T>t$ and $t \leq 1.0$ mm (where T is thickness of the separator at the center and t is thickness of its periphery on which a sealant or the like is placed) has increased pressure drop, because of difficulty in forming the gas passage between the manifold and electrode, in particular.

Such a separator is too thin to be engraved to form gas passages on the surface, and invariably tends to have increased pressure drop in particular at the gas passage connection. Therefore, measures to reduce pressure drop have been demanded.

The present invention provides a fuel cell having at least one unit comprising a first separator in which a fuel gas passage section is formed, first seal sheet which seals the first separator periphery, fuel gas diffusion layer, anode, polymer electrolyte, cathode, oxidizing gas diffusion layer, second seal sheet which seals a second separator periphery and second separator in which an oxidizing gas passage section is formed, in this order, wherein the fuel gas passage section and oxidizing gas passage section are in communication with the manifold in the first and second separator, respectively, a comb teeth structure is provided between the fuel gas passage section and manifold and another structure between the oxidizing gas passage section and manifold, slit spaces are formed between the comb teeth in such a way to be in communication with the diffusion layer, and the manifold in the first separator is in communication with the fuel gas passage section via the slit spaces and manifold in the second separator is in communication with the oxidizing gas passage section via the slit spaces.

Other objects, features and advantages of the invention will become apparent from the following description of the embodiments of the invention taken in conjunction with the accompanying drawings.

DESCRIPTION OF THE REFERENCE NUMERALS AND SIGNS

Figure 1:
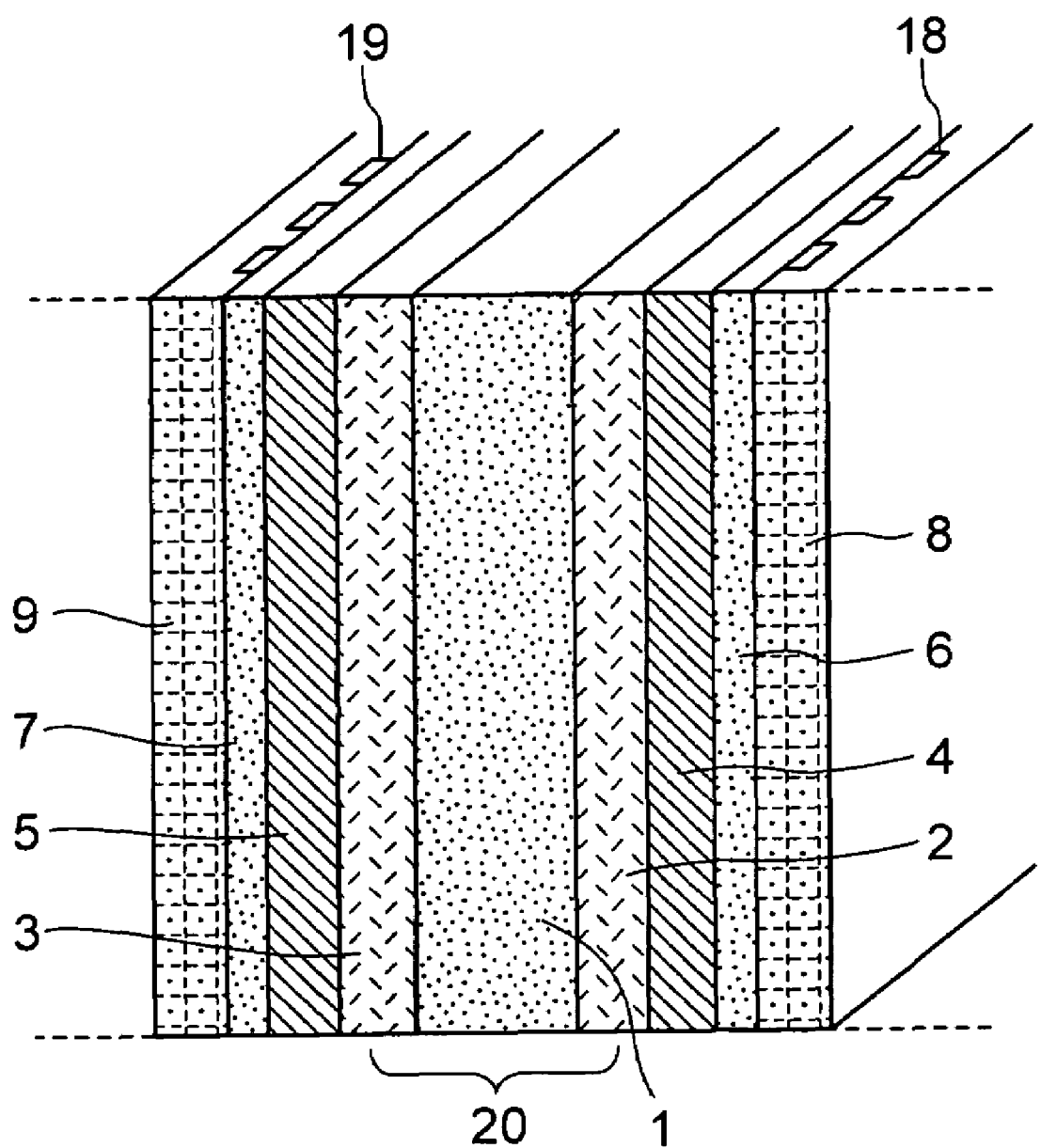
FIG. 1 is an oblique cross-sectional view illustrating part of the unit cell structure of the fuel cell of the present invention, prepared in EXAMPLE 1.

1: Polymer electrolyte, 2: Cathode, 3: Anode, 4: Oxidizing agent diffusion layer, 5: Fuel gas diffusion layer, 6: Second seal sheet, 7: First seal sheet, 8: Second separator, 9: first separator, 18: Oxidizing agent gas passage, 19: Fuel gas passage, 20: MEA, 31: Manifold, 32: passage rib, 33: Comb teeth structure, 34: Separator periphery, 51: Conventional separator, 52: Conventional diffusion layer, 53: Conventional seal sheet, 55: Free space for accommodating the comb teeth structure, 56: Conventional separator periphery

DETAILED DESCRIPTION OF THE INVENTION

One embodiment of the present invention proposes a structure in which a plurality of comb teeth structures are formed on one side of the diffusion layer in the manifold direction, where the slits are formed in the comb teeth structures as the gas passages which connect the manifold to the electrode section. The diffusion layer is of a porous material, and substantially expands the gas passage cross-section at the connection. Therefore, it is expected to exhibit an effect of reducing pressure drop.

Another embodiment of the present invention proposes a structure in which the comb teeth structure is positioned on the extension of the convexes in the gas passage section of the near-by separator. This design allows smother connection of the gases flowing in the gas passages in the comb teeth structure into the passages in the separator, thereby controlling pressure drop increase.

The first and second seal sheets are placed in the respective separator periphery, to seal the area between the gas passages and manifold and between the gas passages and diffusion layer, respectively. The suitable materials for these sheets include a compressive one, e.g., rubber type elastic polymer.

Still another embodiment of the present invention proposes a structure in which the comb teeth are arranged at a pitch of 0.8 to 2.5 mm. Increasing the pitch is effective for expanding cross-section of the gas passages connected to each other by slit spaces in the comb teeth structure. However, the sealing capacity may be deteriorated at an excessive pitch, because the sealant or electrolyte membrane placed in this area may fall into the gas passages making it difficult to hold these parts at a uniform clamping force.

Still another embodiment of the present invention proposes a structure in which thickness of the diffusion layer having the comb teeth structure is set at 0.2 to 0.4 mm to solve the above problems. Thickness of the diffusion layer corresponds to height of the comb teeth structure. Therefore, increasing the thickness expands gas passage cross-section, and thereby reduces pressure drop. However, the thickness has an upper limit, because increasing the thickness increases resistance to flow of the gases towards the electrode catalyst.

Still another embodiment of the present invention proposes a structure in which void fraction of the diffusion layer having the comb teeth structure is set at 50 to 90% when no load is applied. Increasing the void fraction expands gas passage cross-section formed in the spaces in the comb teeth structure. Therefore, increasing the void fraction is effective for reducing pressure drop. However, increasing the void fraction decreases strength of the structure, and may cause deformation of the diffusion layer under a clamping force. It also decreases fraction of the diffusion layer material in the unit volume, which may decrease electron conductivity. Therefore, the preferable void fraction is set in the above range.

One of the preferred embodiments of the present invention provides a fuel cell having two or more stacked units each comprising a first separator in which a fuel gas passage section is formed, first seal sheet which seals the first separator periphery, fuel gas diffusion layer, membrane electrode assembly, second seal sheet which seals a second separator periphery and second separator in which an oxidizing gas diffusion layer and oxidizing gas passage section are formed, in this order, wherein the fuel gas passage section and oxidizing gas passage section are in communication with the manifold in the first and second separator, respectively, a comb teeth structure is provided between the fuel gas passage section and manifold and another structure between the oxidizing gas passage section and manifold in such a way that each is attached to the upper and lower side of the diffusion layer on the membrane electrode assembly to form a monolithic structure, slit spaces are formed between the comb teeth in such a way to connect the manifold to the fuel gas passage section and the other manifold to the oxidizing gas passage section.

The present invention also proposes a structure in which a comb teeth structure is formed in the membrane electrode assembly on each of two sides of the diffusion layer opposite each other. Forming the gas passages, provided by the comb teeth structure on two sides of the diffusion layer can reduce pressure drop from the manifold to the electrode or from the electrode to the manifold, and hence can reduce overall pressure drop in the fuel cell.

The present invention also provides a separator structure comprising a separator in which a gas manifold and gas passage section are formed, seal sheet which seals the separator periphery and gas diffusion layer which is placed in such a way to come into contact with the seal sheet, wherein the manifold and diffusion layer can be in communication with each other via slit spaces in a comb teeth structure formed to be connected to the diffusion layer. The periphery around the separator, on which the seal sheet is placed, is preferably 1 mm thick or less.

The comb teeth structure is preferably placed on the extension of the gas passage section in each of the first and second separator. The slits are preferably arranged at a pitch of 0.8 to 2.5 mm in the comb teeth structure. The diffusion layer having the comb teeth structure a void fraction of 50 to 90%, when no load is applied.

The present invention can reduce gas pressure drop in a fuel cell without limiting the advantages of a thin separator.

EXAMPLES

Example 1

The embodiment of the present invention prepared in EXAMPLE 1 is described by referring to the drawings. FIG. 1 is an oblique cross-sectional view illustrating the major portion of the unit fuel cell structure of the fuel cell, where the manifold and comb teeth structure are not shown. In FIG. 1, 1: polymer electrolyte, 2: cathode, 3: anode, 4: diffusion layer, 5: diffusion layer, 6: seal sheet, 7: seal sheet, the first and second separator being provided around the periphery 8 and 9, respectively, 18: oxidizing gas passage, 19: fuel gas passage, and 20: membrane electrode assembly (hereinafter referred to as MEA), the MEA comprising the polymer electrode 1, cathode 2 and anode 3, with the oxidizing gas diffusion layer 4 and fuel gas diffusion layer 5 provided on each side.

FIG. 2 shows a combination of separator, seal sheet and comb teeth structure for the fuel cell of the present invention, prepared in EXAMPLE 1. In FIG. 2(*a*), 10: separator, 31: manifold for supplying the fuel gas, and 32: passage rib forming the gas passage for supplying the gas from the manifold to the electrode. The separator is 1.6 mm thick at the center and 0.8 mm in the periphery. FIG. 2(*b*) shows the diffusion layers 12 stacked in the separator 10, where the comb teeth structure 33 having a plurality of teeth is formed on one side of the diffusion layer 12.

Figure 2A:
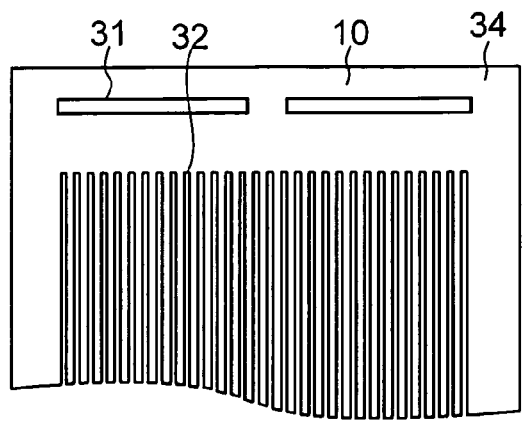
FIG. 2 shows a combination of separator, seal sheet and comb teeth structure for the fuel cell of the present invention, prepared in EXAMPLE 1.
Figure 2B:
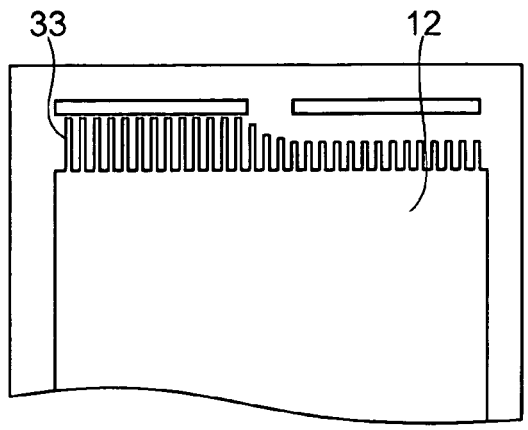
Figure 2C:
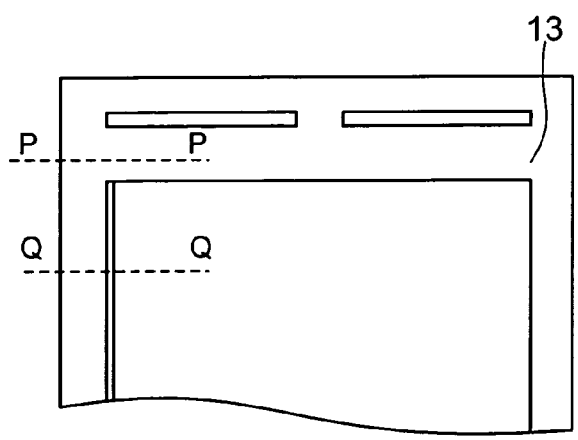
Figure 3A:
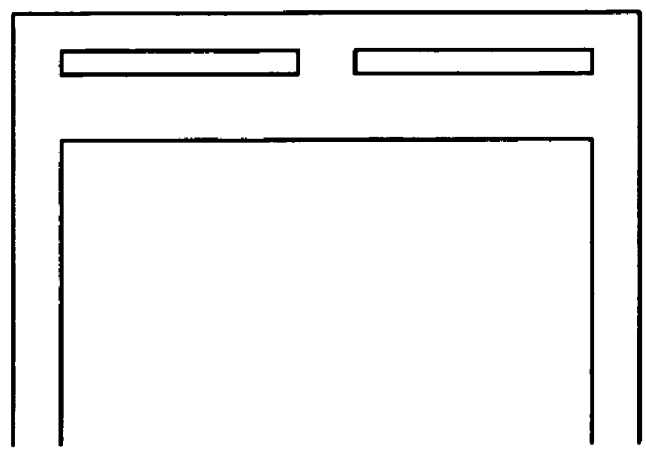
FIG. 3 shows a seal sheet structure for the fuel cell of the present invention.
Figure 3B:
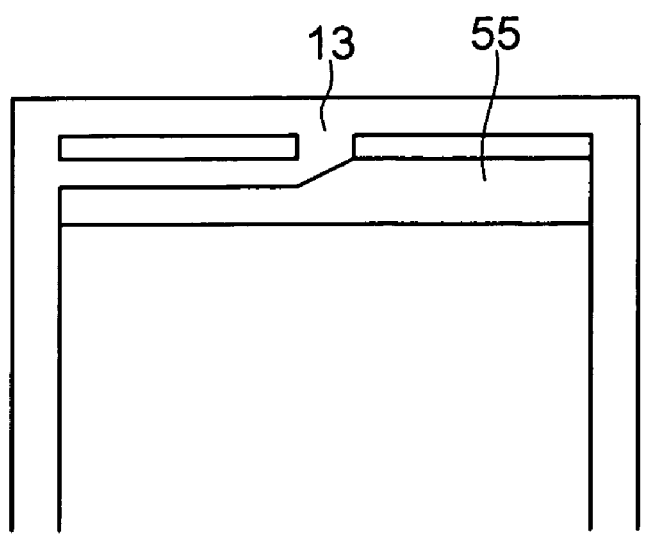

The space (slit space) between the adjacent teeth in the comb teeth structure has a width of 0.75 mm, void fraction of 45% when no load is applied and thickness of 0.18 mm. The comb teeth structure 33 is provided in such a way that its centerline in the width direction is aligned with the width-direction centerline of the gas passage formed by the passage ribs 32. FIG. 2(c) shows the stacked seal sheets 13 formed around the separator periphery. The seal sheet 13 is preferably of an elastic or compressive material, e.g., ethylene/propylene rubber (EPDM). The free space 55 for accommodating the comb teeth structure is provided on the seal sheet 13 in the area overlapping the comb teeth structure, as shown in FIG. 3(b). FIG. 3(a) shows the plane coming into contact with the separator, i.e., the other side of the seal sheet shown in FIG. 3(b).

Figure 2D:
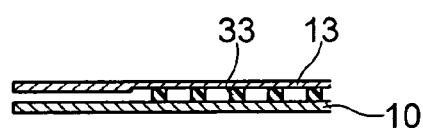
Figure 2E:
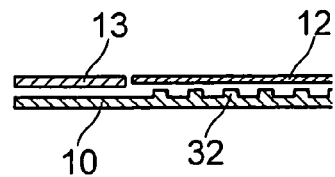

The cross-section cut along the P-P line in FIG. 2(c) is shown in FIG. 2(d), and that along the Q-Q line in FIG. 2(e). A fuel cell was prepared in EXAMPLE 1 by placing 2 sets of the separator materials (separator+seal sheet), shown in FIG. 2(c), one on another around the MEA in such a way that the electrode surface came into contact with the diffusion layer 12.

Example 2

A fuel cell was prepared in EXAMPLE 2 using the diffusion layer 12 with the comb teeth structure 33 formed in such a way that it was aligned with the extended width-direction centerline of the passage ribs formed in the separator 10. Each component was made of the same material as that for the fuel cell prepared in EXAMPLE 1.

Example 3

A fuel cell was prepared in EXAMPLE 3 using the diffusion layer 12 with the comb teeth structures 33 arranged at a pitch of 1.0 mm on its one side. Each component was the same as that for the fuel cell prepared in EXAMPLE 2 in structure and disposition.

Example 4

A fuel cell was prepared in EXAMPLE 2 using the structurally same components as those for the fuel cell prepared in EXAMPLE 3, except that the diffusion layer 12 had a thickness of 0.3 mm.

Example 5

A fuel cell was prepared in EXAMPLE 5 using the structurally same components as those for the fuel cell prepared in EXAMPLE 4, except that the diffusion layer 12 had a void fraction of 70% when no load was applied.

Example 6

A fuel cell was prepared in EXAMPLE 6 using the structurally same components as those for the fuel cell prepared in EXAMPLE 1, except that the diffusion layer 12 had comb teeth structures 33 on the two sides opposite each other.

Comparative Example

FIG. 8 shows the fuel cell structure prepared in COMPARATIVE EXAMPLE. The separator 51 with gas passages having a thickness of 1.6 mm at the center and 1.0 mm in the periphery and made of carbon plate was stacked with the diffusion layer 52 having a thickness of 0.18 mm and void fraction of 45%, and provided with the seal sheet of EPDM, to prepare the separator materials. The gas passage at the center of the separator had a structure similar to that for the one prepared in each EXAMPLE, but was extended to the manifold to directly supply the gas from the manifold to the electrode section.

An air line provided with a humidifier was connected to the cathode side in the cell and a hydrogen-containing gas line provided with a humidifier to the anode side. The gas pressure was measured for the fuel cell prepared in each of EXAMPLES and COMPARATIVE EXAMPLE by a pressure gauge at the cathode gas inlet and outlet, and pressure drop was defined as differential pressure across the inlet and outlet while the gas was flown. The fuel gas was supplied at 2.5 times (or 5/4 times as hydrogen) of air required when electric current was passed at 0.3 A/cm$^2$ for unit electrode area. Steam was injected into the gas supplied to each of the anode and cathode so that the gas had a dew point corresponding to operating temperature of the fuel cell (70° C.).

Figure 4:
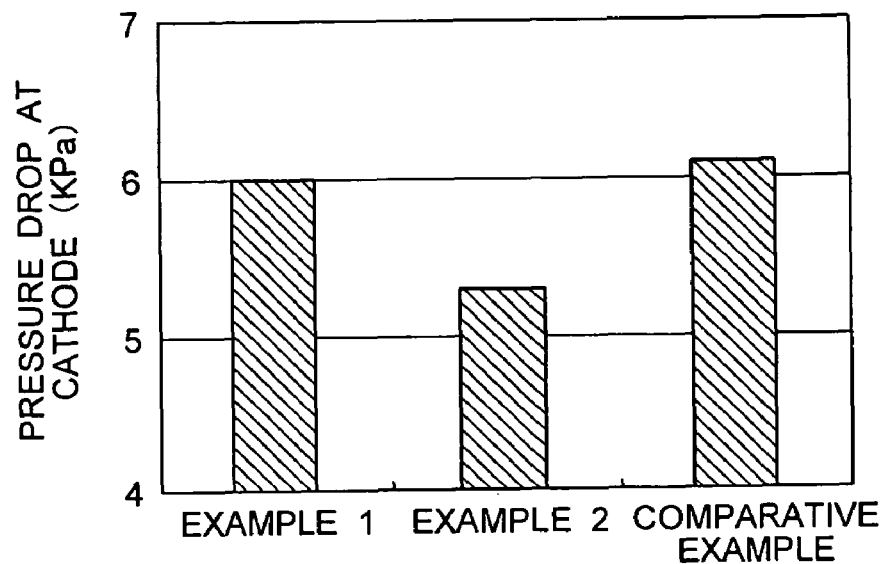
FIG. 4 shows pressure drop at the cathode for the fuel cell, prepared in EXAMPLES 1 and 2 for the present invention and COMPARATIVE EXAMPLE.

FIG. 4 compares the cathode pressure drop results observed in EXAMPLES 1 and 2 and COMPARATIVE EXAMPLE. The fuel cell prepared in EXAMPLE 1 showed a pressure drop of 6.0 kPa versus 6.1 kPa observed in COMPARATIVE EXAMPLE. The lower pressure drop of the former cell conceivably resulted from the function of the gas passages formed by the spaces in the comb teeth structure and the comb teeth structure by itself, which was of a porous material and had substantially expanded gas passage cross-section. The pressure drop was further decreased to 5.3 kPa, conceivably resulting from smoother flow of the gas directly from the manifold to the gas passages leading to the electrode section.

Figure 5:
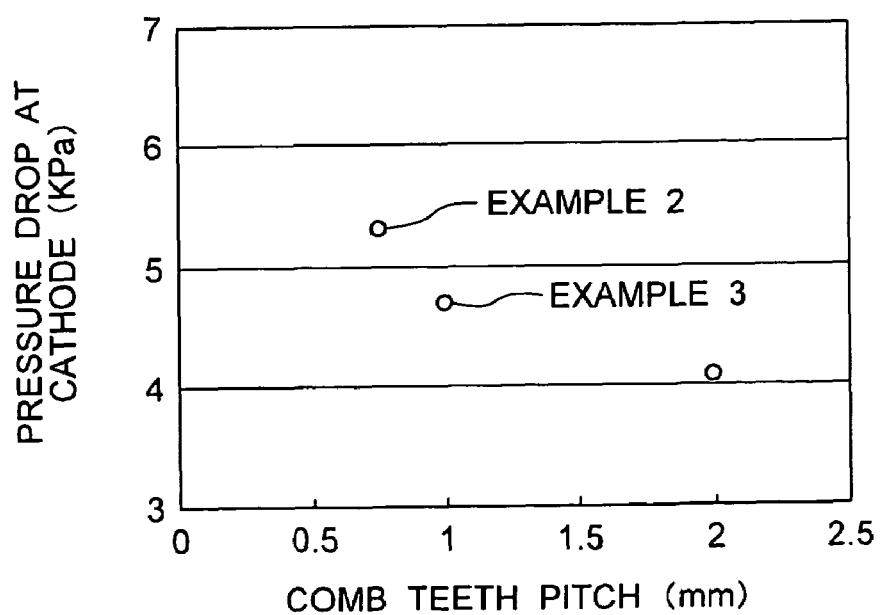
FIG. 5 shows the effect of pitch of the comb teeth structure for the present invention on pressure drop at the cathode.

FIG. 5 shows the effect of pitch of the teeth (slit pitch) in the comb teeth structure on pressure drop at the cathode. The fuel cell prepared in EXAMPLE 3 having the teeth arranged at a pitch of 1.0 mm showed 0.6 kPa lower pressure drop than the one prepared in EXAMPLE 2 having the teeth arranged at a pitch of 0.75 mm, because of the expanded passage cross-section of the former. It was confirmed that the pressure drop decreased to 4.1 kPa at a pitch of 2.0 mm. However, the seal sheet, which was stacked in contact with the comb teeth structure, was clamped by uneven force at a pitch exceeding 2.5 mm to cause local leak of the gas. Therefore, the preferable teeth pitch in the comb teeth structure is in a range from 0.8 to 2.5 mm, in which the seal capacity and pressure drop reduction are simultaneously satisfied.

Figure 6:
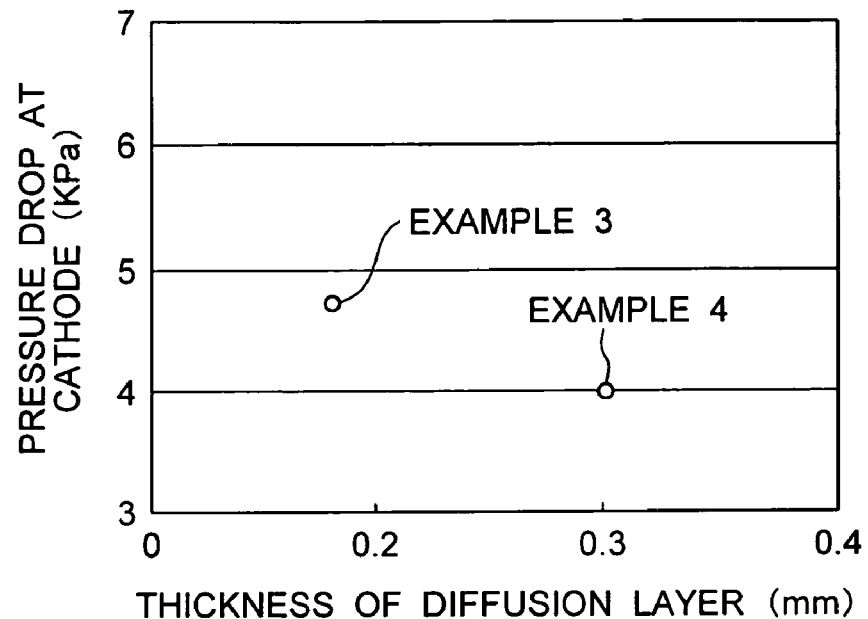
FIG. 6 shows the effect of thickness of the diffusion layer for the present invention on pressure drop at the cathode.

FIG. 6 shows the effect of thickness of the diffusion layer on pressure drop at the cathode. Increasing thickness of the diffusion layer, which is height of the comb teeth structure, expands gas passage cross-section. Therefore, the fuel cell prepared in EXAMPLE 4 having the 0.3 mm thick diffusion layer could have a pressure drop about 0.7 kPa lower than that of the fuel cell prepared in EXAMPLE 3 having the 0.18 mm thick diffusion layer. However, the thickness has an upper limit viewed from the cell performance, because increasing the thickness increases resistance to the gas to be supplied to the electrode catalyst. It is experimentally confirmed that the performance is deteriorated to only a limited extent when the thickness is increased to 0.4 mm, by which is meant that the preferable diffusion layer thickness is in a range from 0.2 mm to 0.4 mm.

Figure 7:
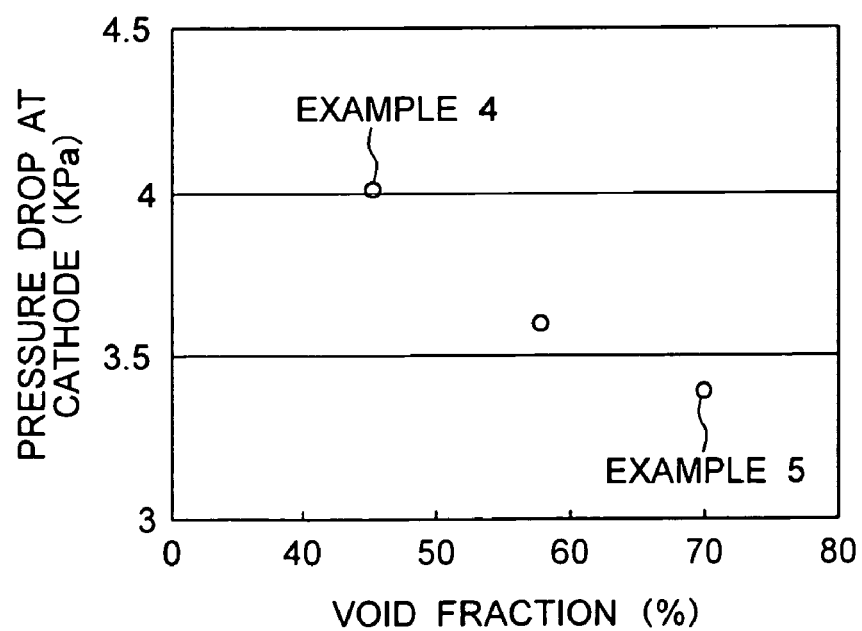
FIG. 7 shows the effect of void fraction of the diffusion layer for the present invention on pressure drop at the cathode.
Figure 8A:
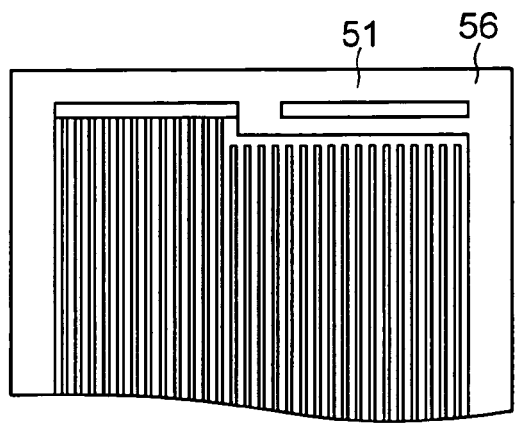
FIG. 8 shows the separator structure, prepared in COMPARATIVE EXAMPLE.
Figure 8B:
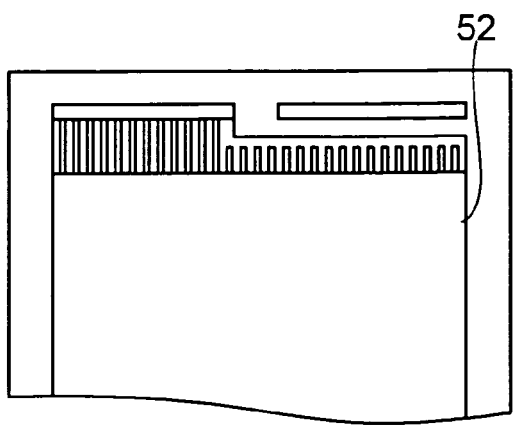
Figure 8C:
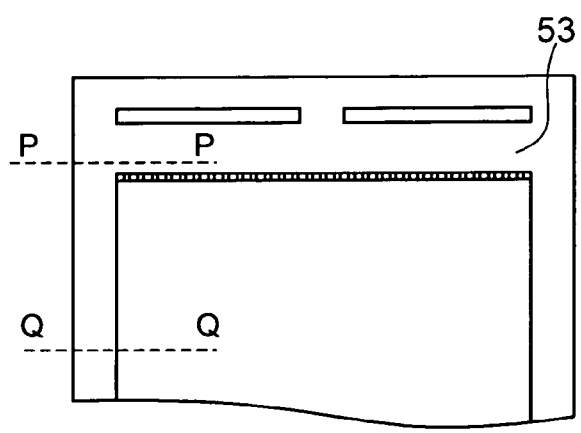
Figure 8D:
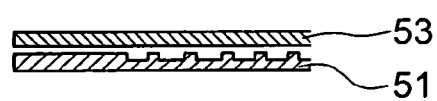
Figure 8E:
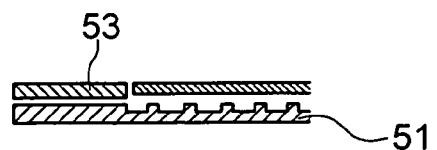

FIG. 7 shows the effect of void fraction of the diffusion layer on pressure drop at the cathode. The fuel cell prepared in EXAMPLE 5 having a diffusion layer void fraction of 70% showed a 0.6 kPa lower pressure drop than the one prepared in EXAMPLE 4 having a fraction of 45%, resulting from the former's expanded gas passage cross-section formed by the spaces between the teeth in the comb teeth structure. However, increasing the void fraction under no load deteriorates structural strength of the diffusion layer, causing its deformation by a clamping force. It is experimentally confirmed that the diffusion layer is deformed to only a limited extent when its void fraction is increased to 90%, by which is meant that the preferable diffusion layer void fraction can be considered to be in a range from 50 to 90%.

Figure 9:
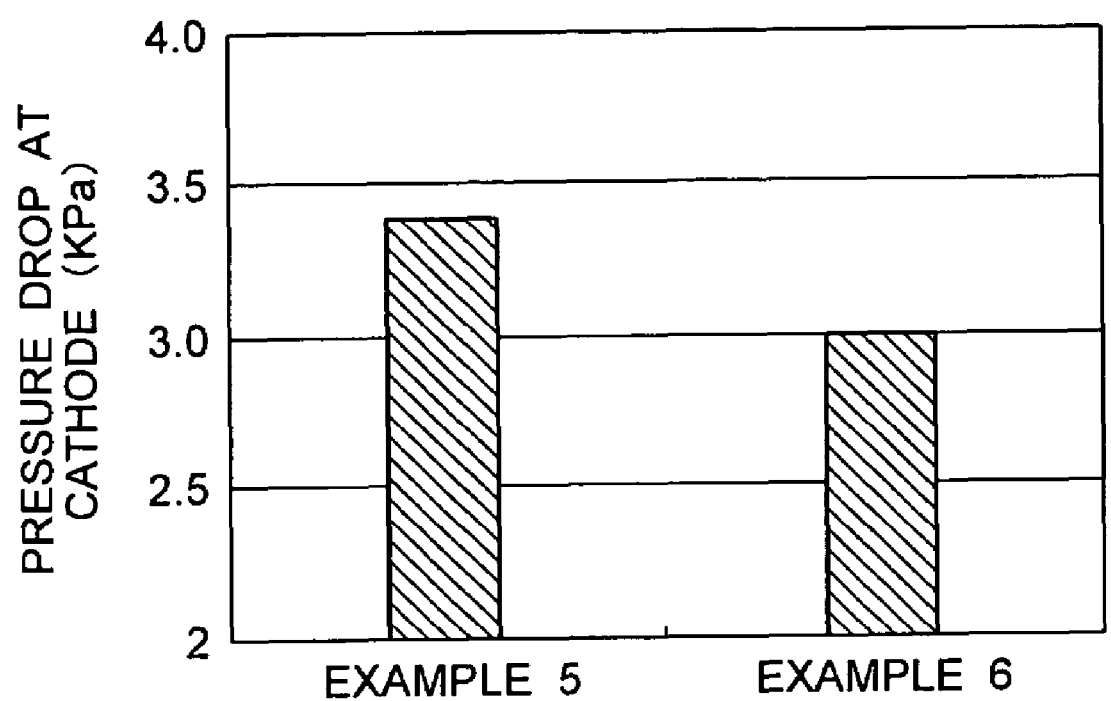
FIG. 9 shows pressure drop at the cathode for the fuel cells of the present invention, prepared in EXAMPLES 5 and 6.

FIG. 9 shows pressure drop at the cathode for the fuel cells prepared in EXAMPLES 5 and 6, where the former was provided with the comb teeth structure only at the gas supply section of the diffusion layer, whereas the latter with the structures both at the supply and discharge section. As shown, it was observed that the latter showed a 0.4 kPa lower pressure drop than the former. It is therefore preferable to provide the comb teeth structures at both sections.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A fuel cell having at least one unit comprising a first separator in which a fuel gas passage section is formed, a first seal sheet which seals the first separator periphery, a fuel gas diffusion layer, an anode, a polymer electrolyte, a cathode, an oxidizing gas diffusion layer, a second seal sheet which seals a second separator periphery and second separator in which an oxidizing gas passage section is formed, in this order, wherein the fuel gas passage section and oxidizing gas passage section are in communication with a fuel gas manifold in the first separator and an oxidizing gas manifold in the second separator, respectively, a comb teeth structure, having comb teeth, is provided between the fuel gas passage section and fuel gas manifold and another comb teeth structure, having comb teeth, is provided between the oxidizing gas passage section and the oxidizing gas manifold, slit spaces are formed between the comb teeth so as to be in communication with the fuel gas and oxidizing gas diffusion layers, and the fuel gas manifold in the first separator is in communication with the fuel gas passage section via the slit spaces between comb teeth of the comb teeth structure, and the oxidizing gas manifold in the second separator is in communication with the oxidizing gas passage section via the slit spaces between comb teeth of the another comb teeth structure, wherein the fuel gas diffusion layer and the oxidizing gas diffusion layer are of a porous material, and at least one of (a) the comb teeth structure is part of the fuel gas diffusion layer and (b) the another comb teeth structure is part of the oxidizing gas diffusion layer.

2. The fuel cell according to claim 1, wherein the periphery around each of said first and second separators, on which said seal sheet is placed, is 1 mm thick or less.

3. The fuel cell according to claim 1, wherein said comb teeth structure and said another comb teeth structure are positioned on an extension of convexes in the fuel gas and oxidizing gas passage sections respectively of said first and second separators.

4. The fuel cell according to claim 1, wherein said slit spaces between said comb teeth of at least one of said comb teeth structure and said another comb teeth structure are arranged at a pitch of 0.8 to 2.5 mm.

5. The fuel cell according to claim 1, wherein thickness of at least one of said fuel gas diffusion layer and said oxidizing gas diffusion layer, having said comb teeth structure, is set at 0.2 to 0.4 mm.

6. The fuel cell according to claim 1, wherein void fraction of at least one of said fuel gas diffusion layer and said oxidizing gas diffusion layer, having comb teeth, is set at 50 to 90% when no load is applied.

7. The fuel cell according to claim 1, wherein said comb teeth structure is formed on each of two sides of the fuel gas diffusion layer opposite to each other.

8. A fuel cell having two or more stacked units each comprising a first separator in which a fuel gas passage section is formed, first seal sheet which seals the first separator periphery, fuel gas diffusion layer, membrane electrode assembly, second seal sheet which seals a second separator periphery and second separator in which an oxidizing gas diffusion layer and oxidizing gas passage section are formed, in this order, wherein the fuel gas passage section and oxidizing gas passage section are in communication with a fuel gas manifold in the first separator and an oxidizing gas manifold in the second separator, respectively, a comb teeth structure, having comb teeth, is provided between the fuel gas passage section and fuel gas manifold and another comb teeth structure, having comb teeth, is provided between the oxidizing gas passage section and the oxidizing gas manifold so that the comb teeth structure is attached to at least one of the sides of the fuel gas diffusion layer on the membrane electrode assembly to form a monolithic structure, and the another comb teeth structure is attached to at least one of the sides of the oxidizing gas diffusion layer to form a monolithic structure, and slit spaces are formed between the comb teeth so as to connect the fuel gas manifold to the fuel gas passage section and the oxidizing gas manifold to the oxidizing gas passage section, wherein the fuel gas diffusion layer and the oxidizing gas diffusion layer are of a porous material, and at least one of (a) the comb teeth structure is a part of the fuel gas diffusion layer and (b) the another comb teeth structure is part of the oxidizing gas diffusion layer.

9. The fuel cell according to claim 8, wherein the periphery around each of said first and second separators, on which said first and second seal sheets respectively are placed, is 1 mm thick or less.

10. The fuel cell according to claim 8, wherein said comb teeth structure and said another comb teeth structure are positioned respectively on extensions of convexes in the fuel gas passage section and the oxidizing gas passage section respectively of said first and second separators.

11. The fuel cell according to claim 8, wherein said slit spaces between said comb teeth of at least one of the comb teeth structure and the another comb teeth structure are arranged at a pitch of 0.8 to 2.5 mm.

12. A separator structure comprising a separator in which a gas manifold and gas passage section are formed, a seal sheet which seals the separator periphery, a gas diffusion layer which is placed so as to come into contact with the seal sheet, and a comb teeth structure, having comb teeth, provided on the gas diffusion layer, wherein the gas manifold and the diffusion layer are in communication with each other via slit spaces between the comb teeth in the comb teeth structure, and wherein the diffusion layer is of a porous material and the comb teeth structure is part of the diffusion layer.

13. The separator structure according to claim 12, wherein said periphery, on which said seal sheet is placed, is 1 mm thick or less.

14. The separator structure according to claim 12, wherein said comb teeth structure is positioned on an extension of said gas passage section.

15. The separator structure according to claim 12, wherein said slit spaces between said comb teeth are arranged at a pitch of 0.8 to 2.5 mm.

16. The separator structure according to claim 12, wherein void fraction of said diffusion layer having said comb teeth structure is set at 50 to 90% when no load is applied.

17. The fuel cell according to claim 1, wherein the comb teeth structure is a part of the fuel gas diffusion layer and the another comb teeth structure is a part of the oxidizing gas diffusion layer.

18. The fuel cell according to claim 4, wherein said slit spaces between said comb teeth of each of said comb teeth structure and said another comb teeth structure are arranged at a pitch of 0.8 to 2.5 mm.

19. The fuel cell according to claim 5, wherein a thickness of each of said fuel gas diffusion layer and said oxidizing gas diffusion layer is set at 0.2 to 0.4 mm.

20. The fuel cell according to claim 6, wherein the void fraction of each of the fuel gas diffusion layer and the oxidizing gas diffusion layer is set at 50 to 90% when no load is applied.

21. The fuel cell according to claim 1, wherein said another comb teeth structure is formed on each of two sides of the oxidizing gas diffusion layer opposite each other.

22. The fuel cell according to claim 11, wherein said slit spaces between said comb teeth of each of said comb teeth structure and said another comb teeth structure are arranged at a pitch of 0.8 to 2.5 mm.

\* \* \* \* \*